Figure 1:
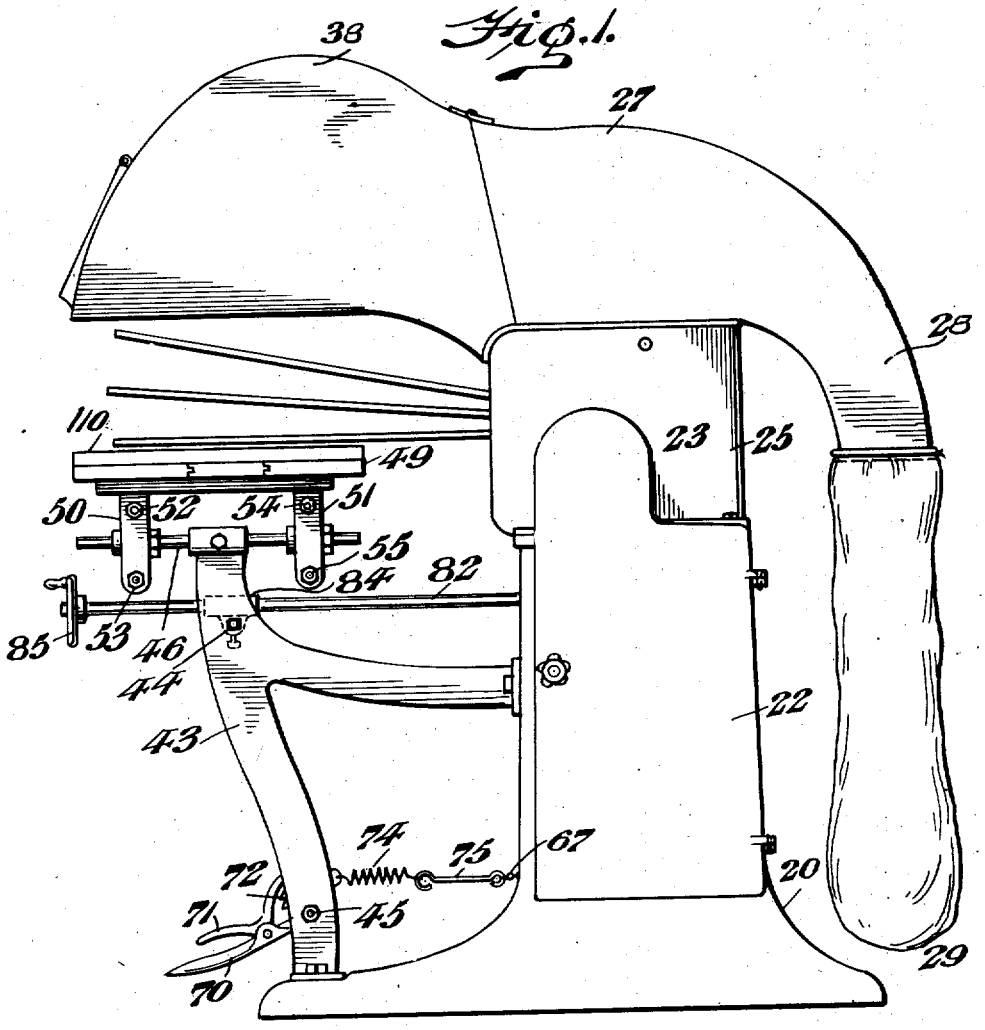

R. OLLEO.

SANITARY BEATING MACHINE.

APPLICATION FILED AUG. 31, 1918.

Reissued Feb. 18, 1919.

14,594.

5 SHEETS—SHEET 1.

Inventor

Ralph Olleo

By Chambers & Hubbell his Attorneys

R. OLLEO.
SANITARY BEATING MACHINE.
APPLICATION FILED AUG. 31, 1918.
Reissued Feb. 18, 1919.
14,594.
5 SHEETS—SHEET 2.
Fig. 2.
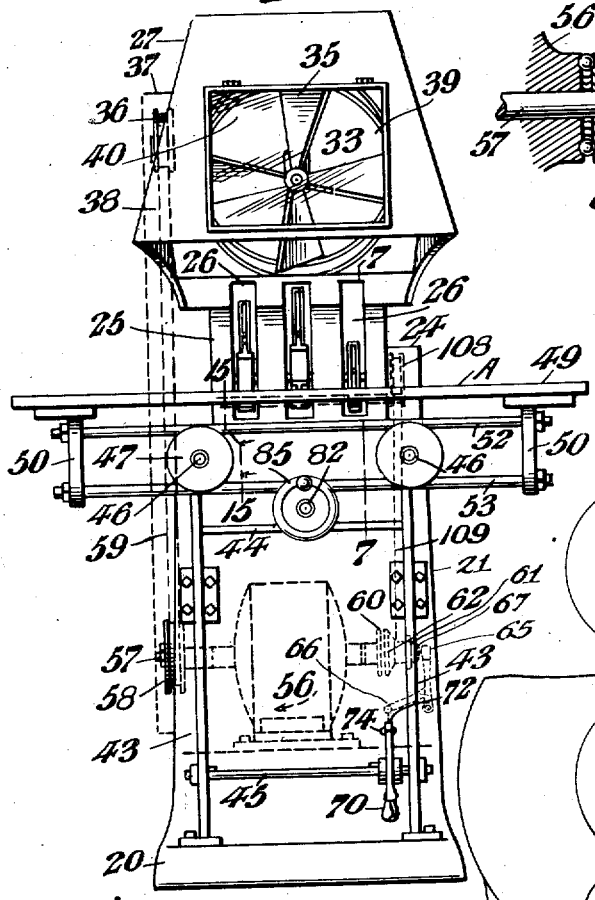
Fig. 4.
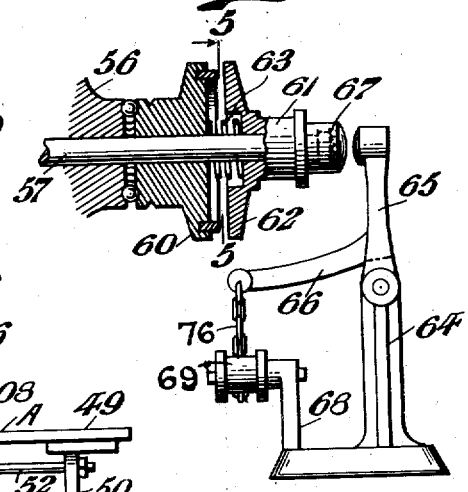
Fig. 5.
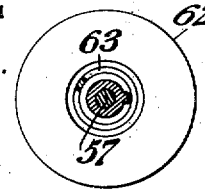
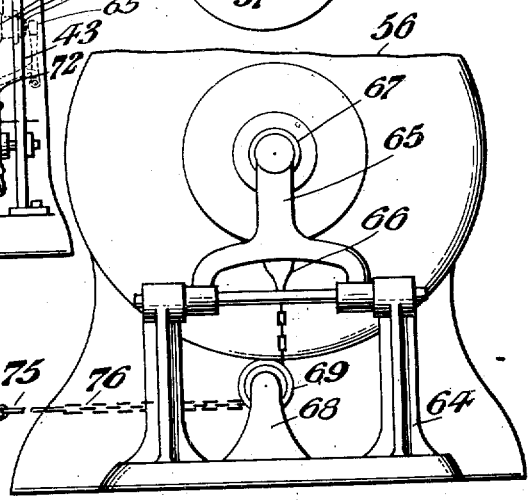
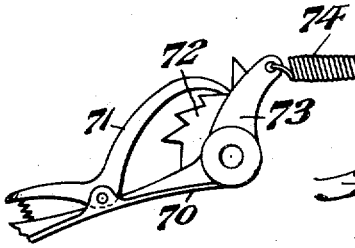
Fig. 3.
Inventor
Ralph Olleo
By Chamberlin & Hubbell
his Attorneys

R. OLLEO.

SANITARY BEATING MACHINE.

APPLICATION FILED AUG. 31, 1918.

Reissued Feb. 18, 1919.

14,594.

5 SHEETS—SHEET 3.

Inventor

Ralph Olleo

By Chambers & Hubbell his Attorneys

R. OLLEO.
SANITARY BEATING MACHINE.
APPLICATION FILED AUG. 31, 1918.
Reissued Feb. 18, 1919.
14,594.
5 SHEETS—SHEET 4.
Fig. 7.
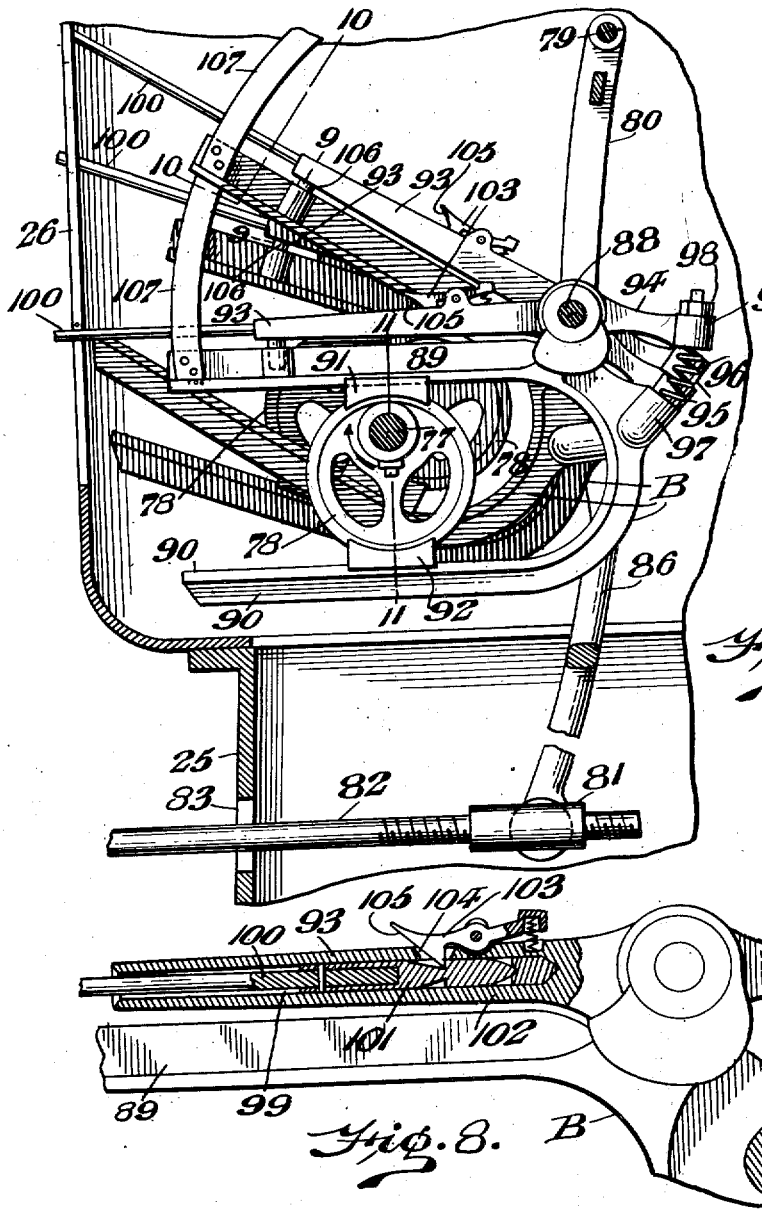
Fig. 9.
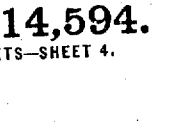
Fig. 10.
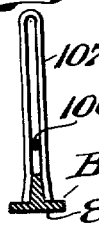
Fig. 11.
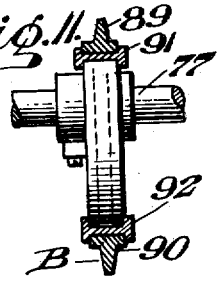
Fig. 8.
Inventor
Ralph Olleo
By Chambers & Hubbell
his Attorneys

R. OLLEO.

SANITARY BEATING MACHINE.

APPLICATION FILED AUG. 31, 1918.

Reissued Feb. 18, 1919.

14,594.

5 SHEETS—SHEET 5.

Inventor

Ralph Olleo

Chambers & Hubbell his Attorneys

UNITED STATES PATENT OFFICE.

RALPH OLLEO, OF NEW YORK, N. Y., ASSIGNOR TO FREDERICK OSANN COMPANY, OF NEW YORK, N. Y., A CORPORATION OF NEW YORK.

SANITARY BEATING-MACHINE.

14,594. Specification of Reissued Letters Patent. Reissued Feb. 18, 1919.

Original No. 1,229,778, dated June 12, 1917, Serial No. 102,321, filed June 7, 1916. Application for reissue filed August 31, 1918. Serial No. 252,268.

*To all whom it may concern:*

Be it known that I, RALPH OLLEO, a resident of the borough of Queens, in the city, county, and State of New York, have invented a certain new and useful Improvement in Sanitary Beating-Machines, of which the following is a true and exact description, reference being had to the drawings, which form a part thereof.

This invention relates to sanitary beating machines adapted for beating furs, skins, robes, cloaks or any material within the limits of its size that requires beating for the purpose of cleaning or to revive the appearance of the material.

It is my purpose, broadly speaking, to provide a machine of the type named wherein the beating elements in their operation will effectively simulate hand beating by producing the essential snap to the blows of the elements, wherein the operation of beating will be thoroughly sanitary in that the workman is protected against inhaling the dust and dirt which is beaten from the material, wherein the workman will be protected against injury, and wherein the material being operated upon will always be in plain view of the workman.

It is my further purpose to provide a beating machine embodying an improved construction which will enable the blows of the beating elements to be delicately adjusted according to the strength and body of the material being operated upon.

It is also my purpose to provide a machine of the character named which will be relatively simple in construction, easily controlled and adjusted, and strong and durable in use.

With the above and other objects in view the invention consists in the details of construction and in the arrangement and combination of parts to be hereinafter more fully described and particularly pointed out in the appended claims.

Figure 6:
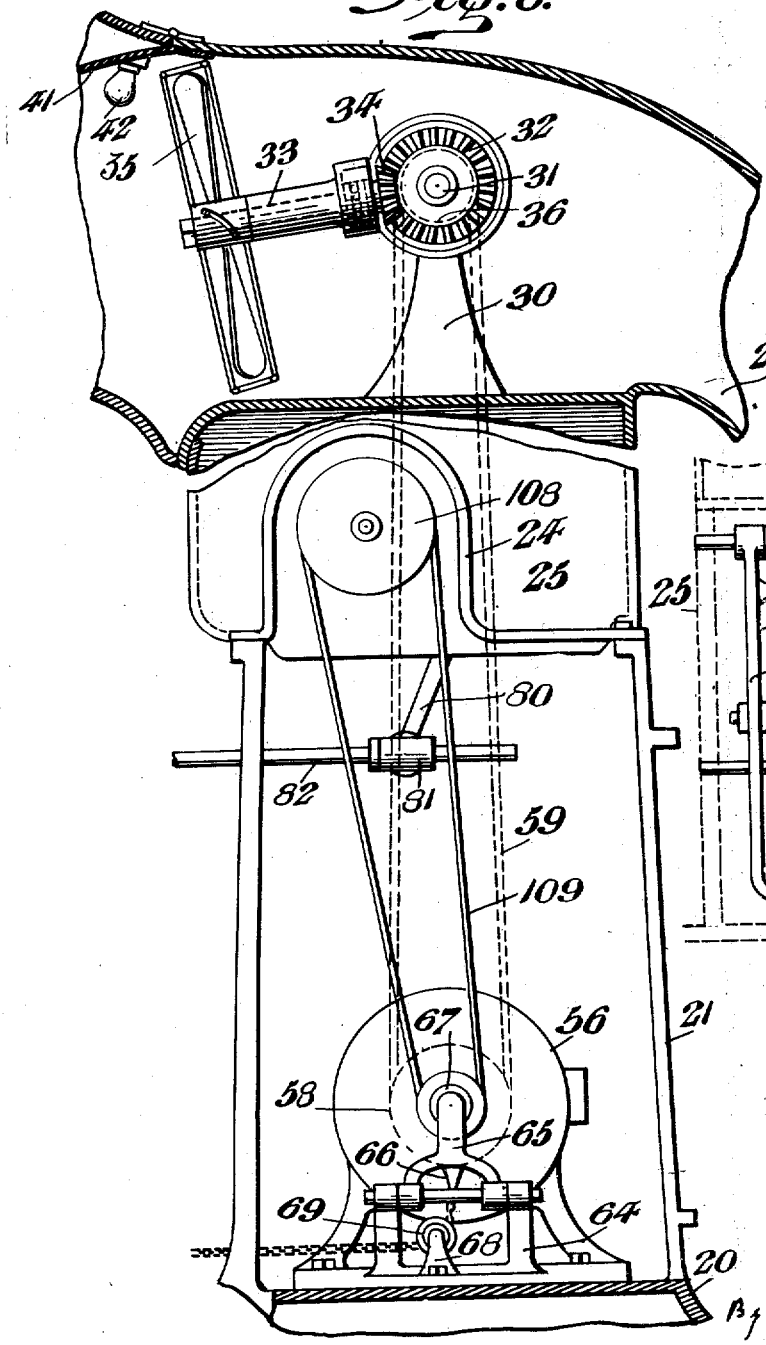
Figure 12:
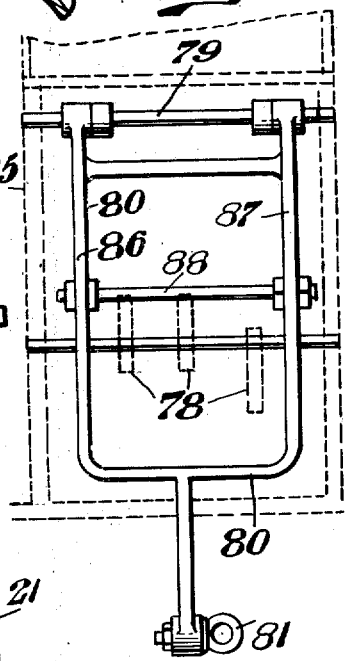
Figure 13:
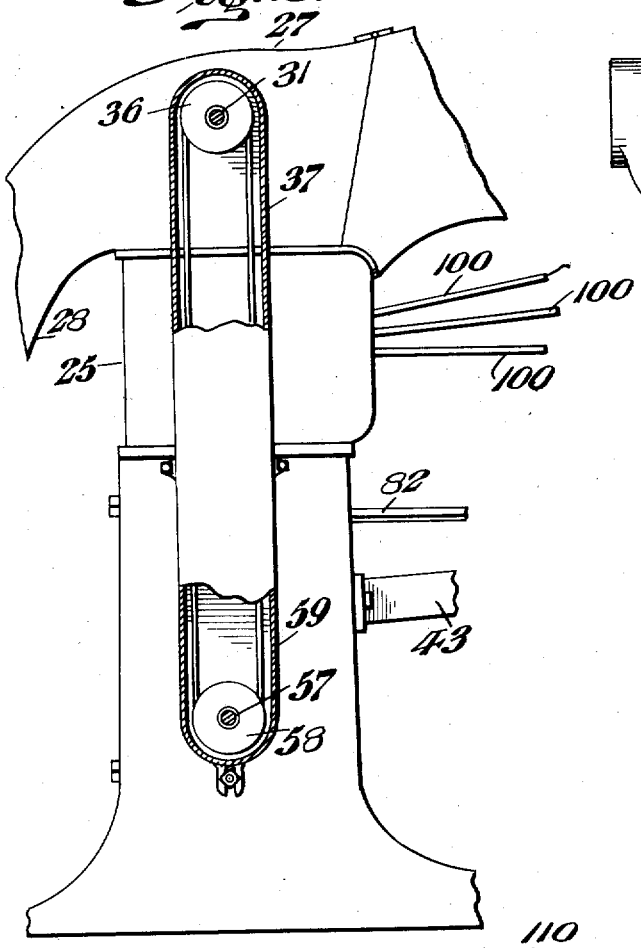
Figure 14:
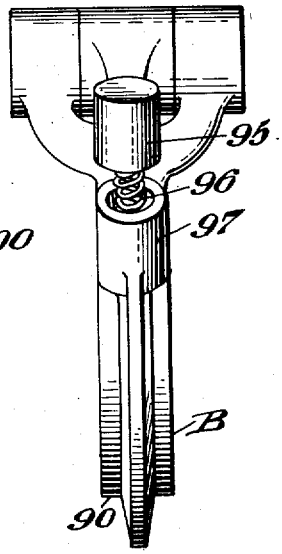
Figure 15:
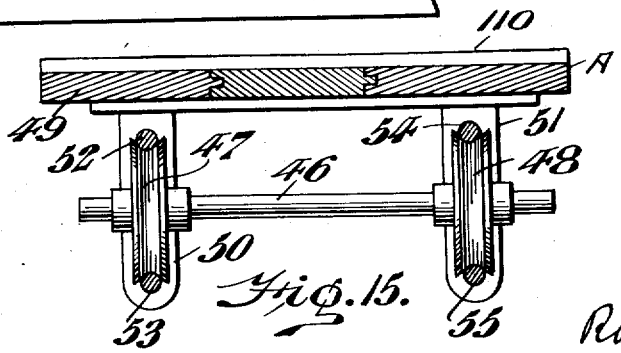

In describing the invention in detail reference will be had to the accompanying drawings wherein like characters of reference denote corresponding parts in the several views, and in which Figure 1 is a side elevation of a beating machine constructed in accordance with my invention;

Fig. 2, a front view of same partly broken away;

Fig. 3, an enlarged side view of the foot controlled clutch employed in the machine;

Fig. 4, a longitudinal section of the clutch with certain adjacent parts shown in elevation;

Fig. 5, a section on the line 5—5 of Fig. 4;

Fig. 6, a side elevation of the machine with the door of the column, and the face plate of the belt wheel housing of the cam shaft removed and the upper portion of the machine broken away to disclose the suction fan;

Fig. 7, an enlarged section on the line 7—7 of Fig. 2;

Fig. 8, a longitudinal section of one of the beater stick holders with adjacent parts shown in elevation and in section;

Fig. 9, a section on the line 9—9 of Fig. 7;

Fig. 10, a section on the line 10—10 of Fig. 7;

Fig. 11, a section on the line 11—11 of Fig. 7;

Fig. 12, a front view of the yoke bracket with certain parts broken away and omitted for the sake of clearness;

Fig. 13, a side elevation of a fragment of the machine partly broken away and showing the fan belt and its housing;

Fig. 14, a rear view of one of the yokes and the related beater stick holder, and Fig. 15, a section on the line 15—15 of Fig. 2.

Referring to the drawings the machine is shown as comprising a base 20 from which rises a column 21. This column is hollow and substantially rectangular in cross section. One side of the column 21 is provided with an opening which is closed by a hinged door 22 whereby access to the parts of the machine mounted within the column can be readily had. This door 22 is provided with an extension 23 on its upper end which constitutes a closure for a housing 24 at the top of the column. Bolted to the top of the column 21 is a casing 25 in which certain parts of the machine are mounted. The front of this casing is provided with a plurality of openings 26 through which the beating elements of the machine project. Mounted upon the casing 25 is a tubular member 27 one end of which terminates in a downwardly extending spout 28 having means on its free end for attaching a bag 29 or other suitable receptacle for the purpose of catching the dust and the dirt that is carried through the member 27 in a manner to be presently referred to. Mounted in the member 27 is a bracket 30 in which is rotatably mounted a shaft 31 having fixed thereon a beveled gear 32. Rotatably mounted on the bracket 30 at right angles to the shaft 31 is another shaft 33 which has fixed thereon a beveled gear 34 in mesh with the gear 32. Also fixed on the forward end of the shaft 33 is a suction fan 35. The shaft 31 projects to the exterior of the member 27 and has fixed thereon a belt wheel 36 disposed within a housing 37 mounted on the side of the machine. Hinged to the forward end of the member 27 adapted to be swung upwardly is a hood 38 having an opening 39 therein which is closed by a transparent pane 40. This opening 39 in conjunction with the pane 40 constitutes an observation window for the operator. Secured to the inner wall of the member 27 at the forward end and at the top is a reflector 41 on which is mounted an electric lamp 42 or any other suitable lamp. It will be noted that the reflector 41 projects into and the lamp 42 is disposed in the limits of the hood 38.

Secured to the base 20 and the front of the column 22 are brackets 43 connected by an upper rod 44 and a lower rod 45. Adjustably mounted in the upper ends of the brackets 43 respectively are rods 46 and slidably and rotatably mounted on each rod 46 are grooved wheels 47 and 48. The beating table of the machine is indicated generally at A and comprises a top 49 from which depend front legs 50 and rear legs 51. The front legs 50 are connected by upper and lower rods 52 and 53 respectively, the grooved wheels 47 resting on the rod 53 while the rod 52 serves as a guide and as a means for holding the table to the grooved wheels. Likewise the legs 51 are connected by upper and lower rods 54 and 55 respectively, the grooved wheels 48 resting on the rod 55 and rod 54 serving the same function as the rod 52. It will be noted that by this construction the operator can adjust the table both forward and backward and from side to side and it will be further noted that the table A is disposed directly beneath the mouth of the hood 38 and in position to receive the direct rays of the light 42 while such rays are shielded from the eyes of the operator observing through the opening 39 by the position of the reflector 41, shape of the hood 38 and the position of the lamp 42 with respect to the opening 39.

Mounted on the base 20 is an electric motor 56 including a shaft 57 which has fixed thereon in the housing 37 a belt wheel 58 and traveling on the belt wheels 58 and 36 is a belt 59 whereby the operation of the motor 56 will rotate the shaft 31 to in turn rotate the suction fan 35. Mounted on the motor shaft 57 adjacent the door 22 is a fixed friction wheel 60, while a belt wheel 61 is rotatably mounted on the shaft 57. One flange of this belt wheel 61 is constituted by a friction member 62 adapted to engage the friction wheel 60 to lock the belt wheel 61 to said friction wheel 60 for rotation with the latter. The flange 62 is normally held out of engagement with the friction wheel 60 by a spring 63. Mounted on the base 20 is a bracket 64 on which is pivoted an angle lever embodying arms 65 and 66, the former being adapted to coöperate with a projection 67 on the belt wheel 61 to force the latter longitudinally to engage the flange 62 with the friction wheel 60. Mounted on the base of the bracket 64 beneath the arm 66 is another bracket 68 on which is rotatably mounted a pulley 69. Rotatably mounted on the rod 45 is a pedal 70 and pivoted upon this pedal is a spring pawl 71 adapted to coöperate with a ratchet 72 fixed on the rod 45. The pedal 70 embodies an arm 75 to which is secured one end of a spring 74. Secured to the other end of the spring 74 is one end of a link 75 and the other end of this link is secured to a chain 76 which latter is trained over the pulley 69 and attached to the arm 66. By this construction it will be obvious that if the pedal 70 is pressed down the angle lever embodying the arms 65 and 66 will be rocked so that the arm 65 will engage the projection 67 and force the belt wheel 61 longitudinally to engage the flange 62 with the friction wheel 60 and thus connect the belt wheel 61 with said friction wheel. Rotatably mounted in the casing 25 is a cam shaft 77 upon which is fixed a plurality of eccentric cams 78. In this instance three such cams are shown but it will be apparent that as many cams may be employed as desired, according to the size of the machine. Mounted transversely in the casing 25 is a rod 79 and suspended from this rod for swinging movement is a yoke bracket 80. Swiveled on the lower end of this bracket 80 is a nut 81 which has threaded therein an adjusting rod 82 extending through an opening 83 in the front wall of the column 21 and rotatably and non-slidably mounted in a bearing 84 which is suitably fixed on the rod 44. The outer end of the adjusting rod 82 has fixed thereon a hand wheel 85 whereby the rod may be conveniently rotated. By this construction it will be apparent that when the rod 82 is rotated in one direction the bracket 80 will be swung rearwardly, while rotation of the rod 82 in the opposite direction will swing said bracket forwardly. The bracket 80 embodies arms 86 and 87 which are connected by a rod 88. Pivoted on this rod are yokes B corresponding in number to the cams 78 and including upper and lower arms 89 and 90 respectively which embrace the related cam 78. Interposed between each cam 78 and the related upper arm 89 is a bearing block 91, while a corresponding bearing block 92 is interposed between each cam and the related lower arm 90. It will be noted that these blocks 91 and 92 are free to slide on their respective yoke arms so as not to interfere with the swinging adjustment of the bracket 80. Pivotally mounted on the rod 88 above each yoke B is a beater stick holder 93 having a rearward extension 94 terminating in a socket 95 in which is seated one end of a spring 96. Each yoke B is also provided with a socket 97 which receives the other end of the related spring 96. Mounted in each extension 94 is an adjusting screw 98 which operates in the socket 95 and serves as a means for varying the tension of the spring 96. Each holder 93 is provided with a recess 99 opening through its free end and in which the end of a related beater stick 100 is adapted to be inserted. Each stick 100 has mounted on the inner end thereof a ferrule 101 having a circumscribing groove forming a shoulder 102 with which a spring latch 103 is adapted to engage, said latch being mounted on the related holder 93 and operating through an opening 104 in said holder. The latch 103 is provided with an inclined face 105 on its forward end which will permit of the use of a screw driver for the purpose of moving the latch to released position and thereby permitting the removal of the beater stick 100 from the holder 93, it being obvious that when a screw driver or other suitable instrument is forced against the face 105 the latch will be operated to released position. It will be noted that the action of each spring 96 is to hold the related beater stick holder 93 against a buffer 106 carried by the related upper arm 89 of a yoke B. Mounted on the free end of each upper arm 89 and embracing the related beater stick 100 is a U-shaped guide member 107. Fixed on the shaft 77 within the housing 24 is a belt wheel 108 and traveling upon this wheel and the belt wheel 61 is a belt 109. The top 49 of the table A has mounted thereon a suitable pad 110.

The operation of the machine is as follows—

Assuming the motor 56 to be running and the belt wheel in the position shown in Fig. 4 the operator after raising the hood 38 will adjust the material to be beaten on the table A and properly position the table to receive the blows of the beating sticks. The hood 38 is then lowered to the position shown in Fig. 1 and further observation by the operator of the work is obtained through the opening 39 with the aid of the light 42. The operator will then press upon the pedal 70 and connect the belt wheel 61 with the friction wheel 60. The resultant rotation of the belt wheel 61 will operate through the belt 109 and belt wheel 108 to rotate the shaft 77. The rotation of this shaft 77 will rotate the cams 78 in the direction indicated by the arrow in Fig. 7. As the coöperation between each cam and the related yoke is the same only the near cam and yoke shown in Fig. 7 will be referred to. It will be noted that this cam 78 is in its lowest position and that as it is rotated in the direction of the arrow it will swing the related yoke upwardly together with the related beater stick holder 93 and beater stick 100. When the cam 78 reaches its uppermost position and begins to descend it will be noted that it approaches the pivot rod 88 and that therefore the descent of the yoke will be much more rapid than the ascent. By the time the beater stick 100 reaches its highest point it has gained enough momentum to cause it to whip or bend before its upward motion is fully retarded. In the meantime the yoke is already on its downward course and as the whipping tendency of the beater stick reacts on the spring 96 as does likewise the yoke B during its descent the spring becomes compressed to a greater extent and reacts on the holder 93 so as to cause said holder and the beater stick to strike downwardly in a very sharp manner similar to hand operation of a beater stick. The strength of the blows imparted by the beater stick 100 can be varied by rotating the rod 82 and swinging the bracket 80 and the yoke carried thereby forwardly and rearwardly. If the bracket 80 is swung forwardly the pivot rod 88 is brought nearer the shaft 77 and as a result a longer and stronger blow will be produced by the beater sticks 100. On the other hand if the bracket 80 is swung rearwardly the pivot rod 88 is moved away from the shaft 77 and under such conditions the length of the strokes and the strength of the blows will be shortened and weakened respectively. It will thus be seen that complete control of the beating elements is possible and that the machine can be readily adjusted to meet the requirements necessitated by the construction and texture of the material to be operated upon.

While I have illustrated and described one form of carrying my invention into practice it will be obvious that various changes in the details of construction and in the arrangement and combination of parts can be resorted to without departing from the scope of my invention as set forth in the appended claims.

It will be observed that the table A can be adjusted without raising the hood 38.

Having now described my invention, what I claim as new and desire to secure by Letters Patent, is:

1. In a beating machine, the combination of a support, spaced brackets mounted on said support, a rod adjustably mounted in each bracket, a pair of grooved wheels rotatably and slidably mounted on each rod, a table, spaced legs depending from each end of the table, spaced rods connecting corresponding legs and engaged in the grooves of related wheels above and below the latter, and a beating mechanism mounted on the support and coöperating with the table.

2. In a beating machine, the combination of a support, a bracket swingingly mounted on said support, a beating element pivoted on said bracket, a cam rotatably mounted on the support and coöperating with the beating element to oscillate same, and means for adjusting the bracket toward and away from the cam.

3. In a beating machine, the combination of a support, an oscillating beating element adjustably mounted on the support, a cam rotatably mounted on the support and cooperating with the beating element to oscillate same, and means for adjusting the beating element toward and away from the cam.

4. In a beating machine, the combination of a pivoted U-shaped yoke, a cam rotatable between the arms of the yoke and operating to oscillate the latter, and a beating element oscillated by the movement of the yoke.

5. In a beating machine, the combination of a support, a bracket swingingly mounted on said support, a U-shaped yoke pivoted on said bracket, a cam rotatably mounted on the support between the arms of the yoke and operating to oscillate the yoke, a beating element oscillated by the movement of the yoke, and means for adjusting the bracket toward and away from the cam.

6. In a beating machine, the combination of a support, a bracket swingingly mounted on said support, a U-shaped yoke pivoted on said bracket, a beater stick holder pivoted on the bracket, a spring interposed between the ends of the holder and yoke and constantly tending to force the holder in the direction of the yoke, a cam rotatably mounted on the support between the arms of the yoke and operating to oscillate the latter, means for adjusting the bracket toward and away from the cam, and a beater stick carried by said holder.

7. In a beating machine, the combination of a support, a bracket swingingly mounted on said support, a U-shaped yoke pivoted on said bracket, a beater stick holder pivoted on the bracket, a spring interposed between the ends of the holder and yoke and constantly tending to force the holder in the direction of the yoke, means for adjusting the tension of said spring, a cam rotatably mounted on the support between the arms of the yoke and operating to oscillate the latter, means for adjusting the bracket toward and away from the cam, and a beater stick carried by said holder.

8. In a beating machine, the combination of a support, a bracket mounted on said support, a yoke pivoted on the bracket, a beater stick holder pivoted on the bracket, spring means constantly tending to force the holder in the direction of the yoke, a cam rotatably mounted on the support and operating to oscillate the yoke, and a beater stick carried by said holder.

9. In a beating machine the combination of a pivoted beater actuator formed with a parallel sided cam way, an eccentric cam mounted between and engaging the sides of said cam way whereby when said cam is rotated at uniform velocity said actuator is given a to and fro movement more rapid in one direction than in the opposite direction, and a beating element oscillated by said actuator.

10. In a beating machine, the combination of a support, an oscillating beater actuator and a beater holder separately pivoted to said support to turn with respect thereto about the same axis and resilient means connecting said actuator and holder and tending to cause the holder to remain in contact with and to oscillate with said actuator toward and away from the work, but adapted to yield to permit said holder to be carried by momentum an additional distance away from the work after said actuator reaches the end of its upward stroke.

11. In a beating machine a support, an oscillating beater actuator pivotally connected to said support, a beater holder pivotally connected to the actuator adjacent the pivotal connection of the latter to said support, and resilient means connecting said actuator and holder and tending to cause the holder to remain in contact with and to oscillate with said actuator toward and away from the work, but adapted to yield to permit said holder to be carried by momentum an additional distance away from the work after said actuator reaches the end of its upward stroke.

RALPH OLLEO.